United States Patent [19]

Dumont

[11] 4,290,609

[45] Sep. 22, 1981

[54] STEAM SEAL

[75] Inventor: Willy Dumont, Nussbaumen, Switzerland

[73] Assignee: BBC, Brown, Boveri & Co., Ltd., Baden, Switzerland

[21] Appl. No.: 70,107

[22] Filed: Aug. 27, 1979

[30] Foreign Application Priority Data

Aug. 31, 1978 [CH] Switzerland .......................... 9183/78

[51] Int. Cl.[3] .................................................. F16J 15/40

[52] U.S. Cl. .......................................... 277/3; 277/155

[58] Field of Search .............................. 277/3, 27, 135

[56] References Cited

U.S. PATENT DOCUMENTS 3,919,854 11/1975 Denis ....................................... 277/3

4,087,097 5/1978 Bossens et al. .......................... 277/3

4,189,156 2/1980 Geary et al. ............................. 277/3

*Primary Examiner*—Robert I. Smith

*Attorney, Agent, or Firm*—Burns, Doane, Swecker & Mathis

[57] ABSTRACT

Apparatus for steam sealing a shaft of a steam turbine is disclosed. The apparatus preferably includes at least four sealing rings which encircle the shaft of the steam turbine. The sealing rings are spaced apart to define at least three regions. A first region, closest to the blades of the turbine, receives contaminated steam and exhibits a below-atmospheric pressure. A third region, furthest from the blades of the turbine, also exhibits a pressure which is less than atmospheric pressure, but which pressure is also less than the pressure in the first region. A second region, arranged between said first and third regions, receives uncontaminated steam and exhibits a pressure which is greater than atmospheric pressure.

14 Claims, 5 Drawing Figures

STEAM SEAL

BACKGROUND AND SUMMARY OF THE PRESENT INVENTION

The invention disclosed herein pertains generally to sealing apparatus, and more particularly to an arrangement of pressure contoured, steam filled regions for sealing the shafts of turbines and the stems of valves.

A steam seal system of the type disclosed herein, wherein a third region is arranged between first and second regions to provide an equalizing region, and from which a mixture of steam and air is exhausted, is described in DEGbm No. 72 40 334.

A primary object of the present invention is to provide an improved steam seal apparatus for the shafts of turbines and the stems of valves, wherein a turbine is driven by contaminated steam.

A further object of the present invention is to provide a steam seal apparatus for a shaft of a turbine which includes safety features which will make it less likely that the steam seal apparatus will fail.

Apparatus for sealing the shafts of steam turbines and the stems of valves, according to a preferred embodiment of the present invention, includes a high pressure steam turbine and a low pressure steam turbine. The high pressure steam turbine receives steam produced in a nuclear reactor, which steam is generally contaminated, through a first line which includes a control valve. The contaminated steam exhausted from the high pressure turbine is fed to the low pressure turbine through a second line which includes a flap valve. A portion of a shaft of the high pressure steam turbine upstream from the turbine's blades, and a portion of the shaft of the high pressure steam turbine downstream from the turbine's blades are encircled by five sealing rings or glands and four sealing rings, respectively. The five rings are separated by four steam filled regions, i.e., each two adjacent rings are separated by a steam filled region, while the four sealing rings are separated by three steam filled regions. Similarly, upstream and downstream portions of a shaft of the low pressure steam turbine are each encircled by four sealing rings, which four sealing rings are separated by three steam filled regions. A stem of the control valve is encircled by five glands which are separated by four steam filled regions, while the flap valve includes four sealing glands which are separated by three steam filled regions.

The steam filling the regions between the turbine sealing rings and the valve sealing rings is either contaminated steam or relatively pure, uncontaminated steam. The contaminated steam is tapped from the line feeding contaminated steam to the high pressure steam turbine and is fed to selected steam regions by feedlines while the pure, uncontaminated steam is produced in a vaporizer and is fed to selected steam regions by different feed lines. In addition, pure and contaminated steam which flows out of, or leaks from, the selected steam regions is fed to other selected steam regions by still other feed lines.

The pressures of the steam in the various steam regions are set at levels which both produce a steam seal and produce predetermined leakoffs of steam and air. With respect to each of the turbine shafts, a pressure of the steam in a steam region farthest from the turbine is set below atmospheric pressure which results in an influx of air and a leakoff of steam and air. A pressure of the steam in a region closest to the turbine, which region receives contaminated steam, is higher than that in the region farthest from the turbine and higher than a condenser steam pressure, which results in a controlled leakoff of contaminated steam. A region situated between the abovementioned regions receives pure steam and exhibits a steam pressure above atmospheric pressure, which results in a controlled leakoff of pure steam.

The apparatus described above is advantageous because the regions which receive contaminated steam constitute a first steam seal system, system A, while the regions which receive pure steam constitute a second (and redundant) steam seal system, system B. While system B generally must operate properly to seal system A from the atmosphere, i.e. to prevent contaminated steam from being released to the atmosphere, either system alone can be operated to produce an effective steam seal, at least for short periods of time. Thus, if there is an unexpected cutoff in the supply of pure steam, the turbines can continue to operate without a loss of vacuum while a normal shutdown of the turbines is effected. If necessary, a normal shutdown of the nuclear reactor can also be effected because of the redundancy in the steam sealing apparatus.

The apparatus described above is also advantageous because the inflow of air produced by the below-atmospheric steam pressure in the regions furthest from each of the turbines results in an improved sealing effect.

BRIEF DESCRIPTION OF THE DRAWINGS

A preferred embodiment of an arrangement according to the present invention is described with reference to the accompanying drawings wherein like members bear like reference numerals, and wherein.

DETAILED DESCRIPTION OF THE PREFERRED EMBODIMENT

Figure 1:
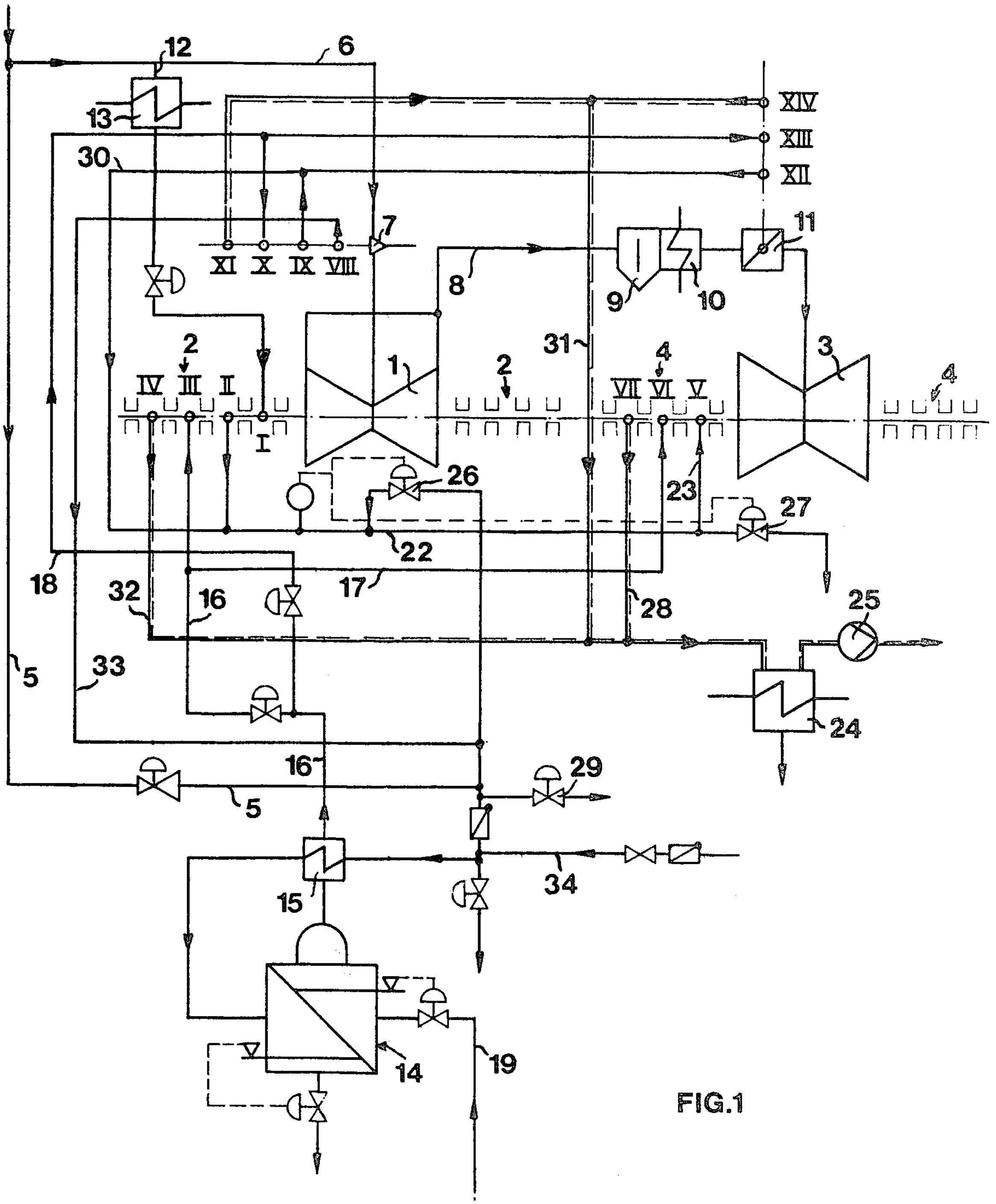
FIG. 1 is a schematic view of a steam turbine power plant which includes a preferred embodiment of a steam seal apparatus, according to the present invention, and which power plant includes a boiling water nuclear reactor (not shown) which supplies steam to the steam turbine power plant.

With reference to FIG. 1, a steam turbine power plant having steam seal apparatus, according to the present invention, includes a high pressure steam turbine 1 with a plurality of high pressure shaft seals 2, and a low pressure steam turbine 3 with a plurality of low pressure shaft seals 4. The high pressure shaft seals 2 include five sealing rings or glands which encircle a portion of a shaft of the high pressure steam turbine 1 upstream from the turbine's blades, and four sealing rings which encircle a portion of the shaft of the high pressure steam turbine downstream from the turbine's blades. The low pressure shaft seals 4 include four sealing rings or glands which encircle a portion of a shaft of the low pressure steam turbine upstream from the low pressure turbine's blades, and four sealing rings which encircle a portion of the shaft of the low pressure steam turbine downstream from the low pressure turbine's blades.

The steam for driving the turbines 1 and 3 is produced in a boiling water nuclear reactor (not shown). This steam, which is generally contaminated, flows through a line 6 to the high pressure turbine 1 with the line 6 including a control valve 7. The contaminated steam which is exhausted from the high pressure turbine 1 flows via a line 8 through a moisture separator 9, a superheater 10 and a control flap valve 11 before entering an inlet of the low pressure turbine 3. A stem of the control valve 7 in the line 6 is encircled by five sealing glands, while the flap valve 11 in the line 8 includes four sealing glands.

The steam seal apparatus used in this steam turbine power plant includes two systems, A and B, which are independent from one another.

The steam seal system A uses contaminated steam for sealing the sealing rings or glands of the turbines 1 and 3, the control valve 7, and the flap valve 11. This steam seal system A is a variable pressure system because a pressure of the contaminated steam used in this system varies as a function of a load of the high pressure turbine 1.

The contaminated steam used in sealing the sealing glands of the high pressure turbine 1 comes directly from the nuclear reactor through a line 12, which line 12 branches off from the line 6. The line 12 includes a superheater 13 for heating the contaminated steam flowing through the line 12. The superheater 13 may be steam-heated or heated electrically.

The sealing glands of the low pressure turbine 3, of the control valve 7, and of the flap valve 11 receive superheated leak-live steam by a throttling effect.

The steam seal system B uses relatively uncontaminated, pure steam. One of the functions of system B is to seal off system A from the atmosphere, i.e. to prevent contaminated steam from escaping into the atmosphere. Unlike system A, system B is a constant pressure, load independent system. That is, a pressure of the pure steam used in the system B is independent of the load of the high pressure turbine 1.

The pure steam used in system B is produced in an evaporator 14 and is then fed to a superheater 15 where it is further heated. A line 16, emanating from the superheater 15, supplies pure, superheated steam to a steam filled sealing region III of the high pressure turbine 1. A line 17 branching off from the line 16, supplies pure steam to a steam filled sealing region VI of the low pressure turbine 4. Pure steam is also fed to particular steam filled sealing regions of the valves 7 and 11 through a line 18 which branches off from the line 16. The line 18 then continues directly to a sealing region XIII of the valve 11. The line 18 also includes a branch line which feeds pure steam to a sealing region X of the valve 7. While pure steam is being fed to the various sealing regions mentioned above, which pure steam is produced in the evaporator 14, a purified condensate is supplied to the evaporator 14 through a supply line 19.

It is to be noted that the term pure steam is to be understood to include only slighly contaminated steam which, without further processing, can be released to the atmosphere.

Either system A or system B may be operated alone to seal the turbine shafts and the valves of the steam turbine power plant, at least for a relatively short period of time. It is also to be noted that both system A and system B include superheaters 13 and 15, respectively, so that the sealing regions of the turbines and valves are only supplied with superheated steam, in order to prevent damage which may be caused by wet steam and erosion.

The evaporator 14 and the superheater 15 are both heated by steam leaking from the gland seal of valve 7. This steam is fed to the evaporator 14 and the superheater 15 through a line 33 which emanates from the gland seal of the valve 7. Additional heat may also be obtained from steam fed from the nuclear reactor through a line 5, which line 5 includes a throttling valve. The superheater 15 and the evaporator 14 are in series with respect to the flow of steam used to heat the superheater 15 and the evaporator 14, so that any residual heat remaining in the steam used to heat the superheater 15 may then be used to heat the evaporator 14. It is to be noted that the steam used to heat the superheater 15 features a constant pressure of about 7 bar which is independent from the load of the high pressure turbine 1.

The pure condensate to be evaporated in the evaporator 14 is fed to the evaporator 14 through a line 19 which emanates from a condensate purification plant (not shown). The condensate may be fed directly to the evaporator 14, or it may be fed to the evaporator after having been preheated. If, however, the condensate is preheated, its delivery to the evaporator 14 must not be restricted by preheating operations. The level of the condensate supplied to the evaporator 14 is preferably kept constant by an intake control. A secondary pressure in the evaporator/superheater 14, 15 is adjusted in accordance with an evaporation output.

As shown in FIG. 1, the high pressure turbine shaft seal 2 includes four areas or regions I, II, III and IV. Region I is closest to the blades of the turbine while regions II, III, and IV are each successively more distant from the turbine's blades. Of the four regions, region I is fed superheated contaminated steam through the line 12. A rate at which pure steam is supplied to the region I is a function of the load borne by the high pressure turbine. A pressure of the steam region I is maintained above the high pressure turbine outlet pressure by a fixed differential value so that the pressure in region I varies in accordance with the outlet pressure. The pressure in region I is also maintained at a higher pressure than that in region IV.

The region III is fed superheated pure seal steam through the line 16. A pressure of the steam in this region must preferably be above atmospheric pressure. The pressure in the region III is kept constant and is kept above the pressures prevailing in the regions II and IV by at least a small amount. The pressure in region III is preferably in the range 1.01 to 1.2 bar. This pressure may, for example, be 1.02 bar.

Excess steam, hereinafter referred to as relief steam, flows from the regions I and III into the region II. This relief steam, which is a mixture of pure and contaminated steam, is supplied through a line 22 to a region V of the low pressure turbine shaft seals. A pressure in the region II must be below atmospheric pressure but greater than the pressure in the region IV. The pressure in the region II may, for example, be 0.98 bar.

A pressure of the steam in the region IV must be below atmospheric pressure and below the pressure in the region III. The pressure in the region IV is preferably in the range 0.90 to 0.98 bar. Thus, the pressure in the region IV may, for example, be 0.97 bar. Because this pressure is less than atmospheric pressure, and less than the pressure in the region III, air flows into region IV from the outside and pure (relief) steam flows in from the region III. This mixture of air and pure steam is exhausted through a line 32 and supplied to a condenser 24, from which condenser the air is forced to the outside atmosphere by a blower 25.

Figure 2:
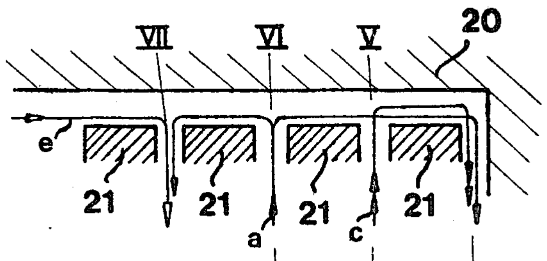
FIG. 2 is an enlarged, cross-sectional view of a preferred embodiment of the steam seal apparatus, according to the present invention, encircling a shaft of a low pressure steam turbine of the steam turbine power plant, which view depicts the leakoffs of steam and air from the steam regions of the steam seal apparatus.

With reference to FIG. 2, four seal rings 21 are arranged around a shaft 20 of the low pressure turbine 3, each of which seal rings exhibits a smooth surface to the shaft 20. In order to form a labyrinth gland, the seal rings 21 may include one or more radially oriented surfaces (or knives). Each of the surfaces of the seal rings 21 facing the shaft 20 exhibits a slight play with respect to the turbine shaft 20. Three regions V, VI and VII (see also FIG. 1) are formed between the seal rings 21. The region V is closest to the blades of the low pressure turbine 3 while the regions VI and VII are each successively more distant from the blades of the low pressure turbine.

A flow of air is depicted in FIG. 2 with white arrows, a flow of pure steam is depicted by black arrows, and a flow of contaminated steam is depicted by two sequential black arrows. In addition, the air flow is also labeled with a letter e, the flow of pure steam with a letter a, and the flow of contaminated steam with a letter c.

As shown in FIG. 1, the region V of the low pressure steam turbine 3 receives relief steam from the region II of the high pressure turbine through the lines 22 and 23. As shown in FIG. 2, the region V also receives pure seal steam from the region VI. A pressure of the steam in region V is below atmospheric pressure but above a pressure prevailing in the region VII. The pressure in the region V may, for example, be 0.98 bar. Relief steam flowing out of the region V flows with the turbine exhaust steam into a condenser (not shown). A pressure in the condenser is lower than the pressure in region V.

A rate at which steam is supplied to the region V is a function of a load borne by the high pressure turbine 3. If the turbines 1 and 3 operate at less than full capacity, then the quantity of contaminated steam supplied to the region I of the high pressure shaft seal 2 is less than normal and thus the quantity of steam supplied to the low pressure region V is no longer sufficient. In this event, a bypass valve 26 may be opened to supply additional steam to the region V from the line 33. If too high a pressure occurs in the region V then a relief valve 27 may be opened to divert excess steam away from the region V through line 22.

The region VI is supplied with superheated pure seal steam through the line 17. A pressure in the region VI is above atmospheric pressure, is kept constant, and is greater than the pressures in the regions V and VII by a slight amount. The pressure in the region VI is preferably in the range 1.01 to 1.2 bar. Thus, the pressure in region VI may, for example, be 1.02 bar.

A pressure of the steam in the region VII must preferably be below atmospheric pressure and below the pressure in the region VI. The pressure in the region VII is preferably in the range 0.90 to 0.98 bar. Thus, the pressure in the region VII may, for example, be 0.97 bar. Because this pressure is less than atmospheric pressure and less than the pressure in the region VI, air flows into the region VII from the outside and pure (relief) steam flows in from the region VI. This air and relief steam is exhausted from the region VII and delivered to a condenser 24 through a line 28.

As shown in FIG. 1, the steam seal for the control valve 7 includes four regions, regions VIII, IX, X, and XI, interspersed between five sealing glands. The steam seal for the flap valve 11 includes three regions, regions XII, XIII, and XIV, interspersed between four sealing glands.

Region VIII of the stem seal of valve 7 is a high pressure relief region (pressure approximately equal to 7 bar). That is, the steam flowing out from the region VIII is throttled steam which is fed through the line 33 to heat the superheater 15 and the evaporator 14. A control valve 29 regulates a flow of excess leakage steam from the region VIII to a preheater or condenser (not shown).

The region IX of the stem seal of valve 7 is a low pressure relief region. The steam exhausted from the region IX, as well as steam from the region XII of the flap valve 11, and the region II of the high pressure turbine 3, are fed through a line 30 to the region V through the lines 22 and 23.

The line 18 connects the region X, of the steam seal of the valve 7, and the region XIII, of the steam seal of the flap valve 11, with the supply of the superheated pure seal steam. A line 31 connects the region XI, of the steam seal of the valve 7, and the region XIV of the steam seal of the valve 11, with the condenser 24 and exhaust blower 25.

The operation of the invention described above is as follows.

Before system A, the system which uses contaminated reactor steam, is placed in operation, system B, the system which uses uncontaminated steam, must first be placed into operation. This is necessary to prevent contaminated steam from being released into the atmosphere. System B is designed so that a complete turbine/condenser vacuum can be achieved without system A.

Because of the redundancy built into the steam sealing apparatus of the present invention, various power plant shutdown conditions can be attempted including, for example, a vacuum test of the turbines in the event of a loss of reactor steam.

The turbines 1 and 3 are started using only system B, the system which uses uncontaminated steam. The contaminated steam seal system, system A, must be brought into operation, at the latest, after the turbines have begun rotating but before they achieve a 5 percent load. If a greater load were to be applied before the contaminated steam seal system was brought into operation, then the high pressure turbine glands would be in danger of erosion produced by inflowing wet steam.

Figure 3:
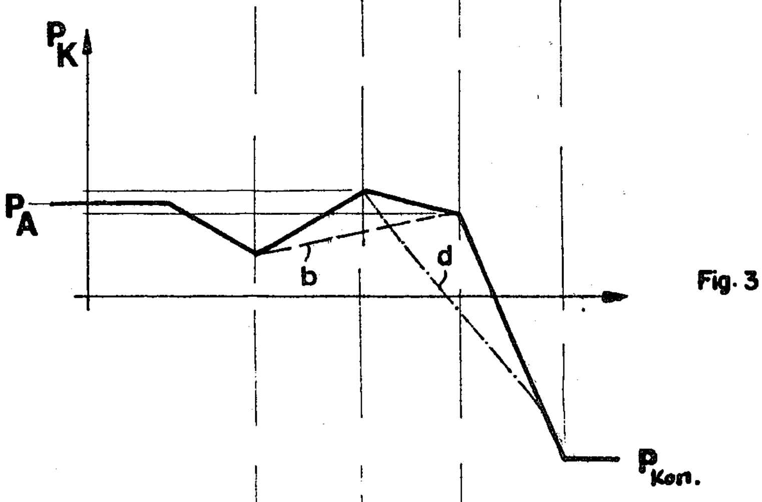
FIG. 3 is a graph of the pressures in the steam regions of the steam seal apparatus shown in FIG. 2.

FIG. 3 provides a graphic plot of the pressure, $P_K$, prevailing in each of the regions of the low pressure turbine shaft seal 4, which regions are shown in FIG. 2. In FIG. 3 the atmospheric pressure is denoted by $P_A$ and the pressure in the condenser by $P_{Kond}$.

Figure 5:
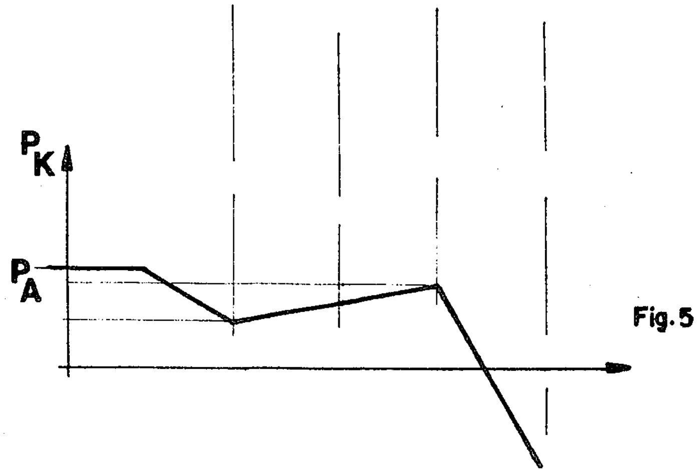

If the supply of pure seal steam, labeled with the letter a in FIG. 2, fails, then the pressure between the regions V and VII develops according to a dashed line b which is shown in FIG. 3, and repeated as a solid line in FIG. 5. If the supply of contaminated seal steam, labeled with the letter c in FIG. 2, fails, then the pressure between the region VI and the low pressure turbine 3 develops according to a dot-dash line d shown in FIG. 3. The flow of air sucked into the steam seal of the low pressure turbine is denoted by the letter e in FIG. 2.

Starting the steam turbine power plant using only the contaminated steam seal system, without the pure steam seal system, is possible, in principle, but is not desirable in practice.

Figure 4:
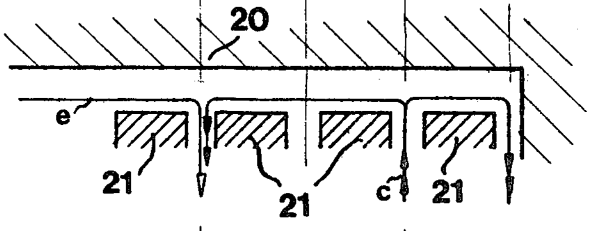
FIG. 4 is a view similar to FIG. 2 and depicts the leakoffs of steam and air from the regions of the steam seal apparatus in the event of a cutoff in the supply of pure steam; and, FIG. 5 is a graph of the pressures in the steam regions of the steam seal apparatus shown in FIG. 4 in the event of a cutoff in the supply of pure steam.

If the delivery of pure steam seal to the shaft seals of turbine 3 fails to occur for any reason whatsoever, then the flow of air and steam through the regions V, VI, and VII, and the pressures in these regions, is that shown in FIGS. 4 and 5. The steam turbine power plant can continue to be operated in this state without a loss of condenser vaccum, which implies a capability for slowly reducing the load and shutting down the turbines and the reactor. An undesired reactor/turbine fast shutdown (scram) can thus be avoided.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed is:

1. In a fluid seal apparatus for a member, which fluid seal apparatus includes a plurality of spaced-apart seal rings arranged about said member defining at least a first region, a second region, and a third region in communication with the atmosphere and with a low pressure chamber at a pressure below atmospheric pressure, which regions communicate with one another and which are sequentially arranged with respect to the member to be sealed, a first source of first fluid, and a second source of a second fluid, the improvement comprising:

first means for conducting said first fluid from said first source to said first region at a first pressure, said first pressure being below atmospheric pressure;

second means for conducting said second fluid from said second source to said second region at a second pressure, said second pressure being greater than atmospheric pressure;

third means for conducting a mixture of air and said second fluid from said third region to said low pressure chamber, said second fluid flowing from said second region to said third region and air flowing from the atmosphere to said third region; and fourth means for withdrawing a mixture of said first and second fluids from said first region, said second fluid flowing from said second region to said first region, whereby pure seal steam may be supplied as said second fluid while impure seal steam may be supplied as said first fluid to prevent the leakage of said impure steam.

2. In a fluid seal apparatus for a member, which fluid seal apparatus includes a plurality of spaced-apart seal rings arranged about said member defining at least a first region, a second region, a third region in communication with the atmosphere and with a low pressure chamber at a pressure below atmospheric pressure, and a fourth region arranged between said first and second regions, which first, fourth, second and third regions communicate with one another and which are sequentially arranged with respect to the member to be sealed, a first source of a first fluid, and a second source of a second fluid, the improvement comprising:

first means for conducting said first fluid from said first source to said first region at a first pressure, said first pressure being greater than a pressure in said third region;

second means for conducting said second fluid from said second source to said second region at a second pressure, said second pressure being above atmospheric pressure and greater than a pressure in said third region or a pressure in said fourth region third means for conducting a mixture of air and said second fluid from said third region to said low pressure chamber, said second fluid flowing from said second region to said third region and air flowing from the atmosphere to said third region; and fourth means for withdrawing a mixture of said first and second fluids from said fourth region, said first and second fluids flowing from said first and second regions, respectively, to said fourth region, whereby pure seal steam may be supplied as said second fluid while impure seal steam may be supplied as said first fluid to prevent the leakage of said impure steam.

3. Apparatus in accordance with claims 1 or 2 wherein said first fluid includes impure steam and said second fluid includes relatively pure steam.

4. Apparatus in accordance with claim 2 wherein said second source of said second fluid includes an evaporator.

5. Apparatus in accordance with claims 1 or 2 wherein said member is a shaft of a turbine.

6. Apparatus in accordance with claim 5 wherein the first means supplies the first fluid to the first region at a pressure proportional to a load borne by the turbine, and the second means supplies the second fluid to the second region at a pressure which is independent of the load borne by the turbine.

7. Apparatus in accordance with claims 1 or 2 wherein said member is a stem of a valve.

8. Apparatus in accordance with claims 1 or 2 wherein said member is a cylindrical member and said regions are sequentially arranged about the cylindrical member.

9. Apparatus in accordance with claims 1 or 2 wherein said third region is at a third pressure, which third pressure is below atmospheric pressure and lower than the second pressure.

10. Apparatus in accordance with claims 1 or 2 wherein the second pressure is in the range 1.01 to 1.2 bar.

11. Apparatus in accordance with claim 9 wherein the third pressure is in the range 0.90 to 0.98 bar.

12. Apparatus in accordance with claim 9 wherein the third pressure is 0.97 bar.

13. Apparatus in accordance with claim 1 wherein the first pressure is 0.98 bar.

14. Apparatus in accordance with claims 1 or 2 wherein the second pressure is 1.02 bar.

* * * * *